(12) United States Patent
Bajic et al.

(10) Patent No.: US 7,832,798 B2
(45) Date of Patent: Nov. 16, 2010

(54) VALVE LAYER FOR A SEAT

(75) Inventors: Goran Bajic, Belle River (CA); Marinko Lazanja, Windsor (CA); Zoran Panic, Windsor (CA); Boris Zlotin, Southfield, MI (US); Peter Ulan, Southfield, MI (US); Vladimir Gerasimov, Southfield, MI (US); Vladimir Proseanik, Southfield, MI (US)

(73) Assignee: W.E.T. Automotive Systems AG, Odelzhausen (DE)

( * ) Notice: Subject to any disclaimer, the term of this patent is extended or adjusted under 35 U.S.C. 154(b) by 0 days.

(21) Appl. No.: 12/814,588

(22) Filed: Jun. 14, 2010

(65) Prior Publication Data

US 2010/0253117 A1    Oct. 7, 2010

(51) Int. Cl.
*A47C 31/00* (2006.01)

(52) U.S. Cl. .............................. 297/180.16; 297/180.1; 297/452.46; 297/452.47

(58) Field of Classification Search .............. 297/180.1, 297/180.11–180.16, 452.42–452.47; 5/423
See application file for complete search history.

(56) References Cited

U.S. PATENT DOCUMENTS

| | | | | |
|---|---|---|---|---|
| 3,506,308 A * | 4/1970 | Fenton | .................. | 297/452.47 |
| 3,818,522 A * | 6/1974 | Schuster | ..................... | 5/652.1 |
| 3,942,202 A * | 3/1976 | Chevrolet | ...................... | 5/689 |
| 4,149,285 A * | 4/1979 | Stanton | ......................... | 5/689 |
| 5,001,793 A * | 3/1991 | Lui | ................ | 5/710 |
| 5,004,294 A * | 4/1991 | Lin | ....................... | 297/180.11 |
| 5,226,188 A * | 7/1993 | Liou | ............................. | 5/653 |
| 5,416,935 A * | 5/1995 | Nieh | ............................. | 5/423 |
| 5,590,428 A * | 1/1997 | Roter | ............................ | 5/726 |
| 6,109,688 A * | 8/2000 | Wurz et al. | ............ | 297/180.14 |
| 6,581,225 B1 * | 6/2003 | Imai | ............................... | 5/423 |
| 6,687,933 B2 * | 2/2004 | Habboub et al. | ............... | 5/654 |
| 7,278,179 B2 * | 10/2007 | Schneider | ...................... | 5/714 |

* cited by examiner

*Primary Examiner*—Laurie K Cranmer
(74) *Attorney, Agent, or Firm*—Dobrusin & Thennisch PC

(57) ABSTRACT

In one aspect, the present invention provides a ventilated seat with a valve sheet having one or more valve assemblies. The valve sheet maybe on a frame of the seat. The valve assemblies open in response to a force such as a force applied by an individual occupying the seat. In another aspect, the present invention provides a method of thermally regulating a seat by occupying a seat with a valve sheet. By occupying the seat one or more valves assemblies open air moving though the open valve assemblies thermally regulates the seat.

3 Claims, 7 Drawing Sheets

VALVE LAYER FOR A SEAT

CLAIM OF PRIORITY

This application is a continuation of and claims the benefit of U.S. application Ser. No. 11/001,294, filed Dec. 1, 2004 and co-pending application Ser. No. 12/266,127, filed Nov. 6, 2008.

TECHNICAL FIELD

The present invention relates generally to thermal regulation of seats, and more particularly to providing heating, cooling, ventilation dehumidification or a combination thereof to an automotive seat.

BACKGROUND

For many years the transportation industry has been concerned with designing seats for automotive vehicles that provide added comfort to occupants in the seats. Various innovations in providing seating comfort are discussed in U.S. Pat. Nos. 6,064,037; 5,921,314; 5,403,065; 6,048,024 and 6,003,950, all of which are expressly incorporated herein by reference. In addition, other innovations in providing seating comfort are discussed in U.S. patent application Ser. No. 09/619,171, filed Jul. 19, 2000, titled "Ventilated Seat Having a Pad Assembly and a Distribution Device"; U.S. Publication No. 2002/0096931, filed Jan. 5, 2001, titled "Ventilated Seat"; U.S. Pat. No. 6,629,724, issued Oct. 7, 2003, titled "Portable Ventilated Seat"; U.S. patent application Ser. No. 10/434,890, filed May 9, 2003, titled "Automotive Vehicle Seat Insert"; U.S. patent application Ser. No. 10/463,052, filed Jun. 17, 2003, titled "Automotive Vehicle Seating Comfort System"; and U.S. patent application Ser. No. 10/681,555, filed Oct. 8, 2003, titled "Automotive Vehicle Seating Comfort System", each of which are expressly incorporated herein by reference for all purposes.

In the interest of continuing such innovation, the present invention provides an improved system for a seat, which is preferably suitable for employment within or as part of an automotive vehicle seat and which assists in providing comfort control to an occupant in the seat.

SUMMARY OF THE INVENTION

In one aspect, the present invention provides a ventilated seat with a valve sheet having one or more valve assemblies. The valve sheet maybe on a frame of the seat. The valve assemblies open in response to a force such as a force applied by an individual occupying the seat. In another aspect, the present invention provides a method of thermally regulating a seat by occupying a seat with a valve sheet. By occupying the seat one or more valves assemblies open air moving though the open valve assemblies thermally regulates the seat.

DETAILED DESCRIPTION OF THE PREFERRED EMBODIMENT

Figure 1:
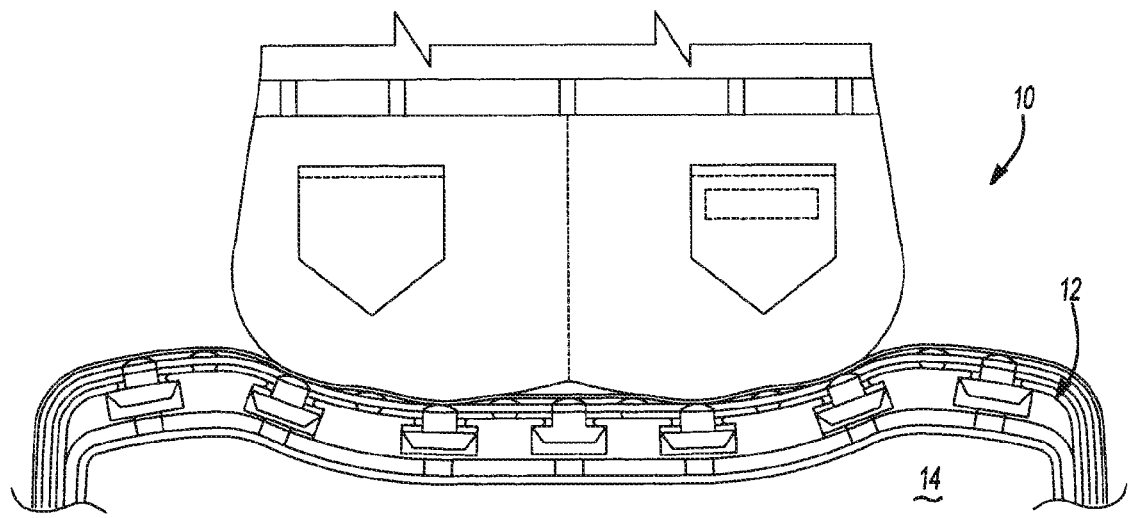
FIG. 1 illustrates a first ventilated seat according to the teachings of the present invention.

The present invention includes a ventilated seat that is capable of providing thermal regulation, e.g., heating, cooling, ventilation, dehumidification or combinations thereof, of an occupant. More specifically, in one aspect, the ventilation seat is adapted to provide selective thermal regulation to at least one portion of the seat, seat back, arm rest, head rest or combinations thereof, for comfort of the occupant. The thermal regulation may be achieved through one or more selectively operable valves that open upon the application of force. Preferably, the force is the result of an occupant sitting in the seat, although other sources of force may also be utilized, such as electro-magnetically, hydraulic, pneumatic, mechanical or otherwise produced force. The selectively operable valves permit thermal regulation of less then the entire seat area and preferably only the area covered by the occupant. This selective use of thermal regulation provides improved operating efficiency by mostly providing thermal regulation only to the occupant.

The ventilated seat includes at least one force sensitive valve on a sheet and preferably a plurality of force sensitive valves on a sheet. The valve sheet may be in the form of a seating surface attached to a frame or other support structure. Preferably the valve sheet is combined with other components to form the ventilated seat, such as seat covers, cushions (e.g. foam seat cushion), inserts, fans, fluid conditioners, conduits, valves in the conduits, sensors and/or controls.

The one or more valves of the valve sheet are adapted to open upon an application of force and to substantially close when the force is removed. As such, air will pass through the valve sheet when an occupant is present. Furthermore, air is provided only to specified regions of the valve sheet where force is being applied. As such, it is possible to only heat, cool, ventilate or dehumidify areas of the ventilated seat where the occupant is.

The valve sheet may be comprised of a single layer or a plurality of layers. For example, referring to the embodiments shown FIGS. 1, 2a-b, 11a-b and 12a-b, the valve sheet may include two or more layers adapted for movement relative to one another to cause the valve assemblies to open or close. Alternatively, referring to embodiments shown in FIGS. 3a-10b, the valves may comprise a single layer, which opens when the valve assembly is deformed. In either of the above instances, the opening and closing of the valve assemblies are predicated upon the application of force; typically applied by an individual occupying the seat. Upon the application of force, air is allowed to move through the valve assemblies.

Suitable valve assemblies that may be used with the present invention include valves that are adapted to open and closed based upon the application and/or cessation of force. Suitable valve types that may be used with the present invention includes one or more butt valve, cut valves, finger valves, split valves, plunger valves, sliding valves, combinations thereof or otherwise. However, other suitable valves such as electric, pneumatic, hydraulic, or mechanical valves may also be used, particularly when used with occupancy sensors.

In view of the foregoing, the following embodiments are discussed as they are applied to seats and more particularly automotive seats and seat backs.

Figure 2A:
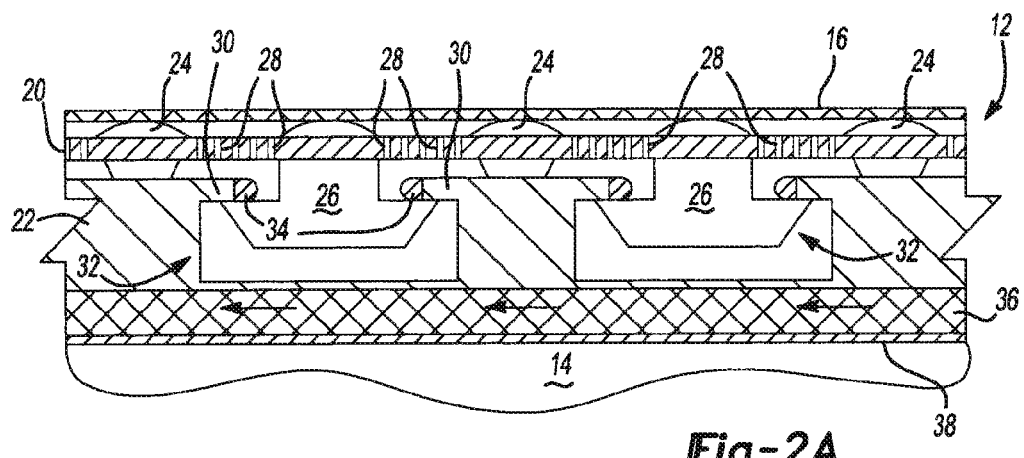
FIGS. 2a and 2b are enlarged views of the valve sheet of FIG. 1 shown with valve assemblies in open and closed positions, respectively.
Figure 2B:
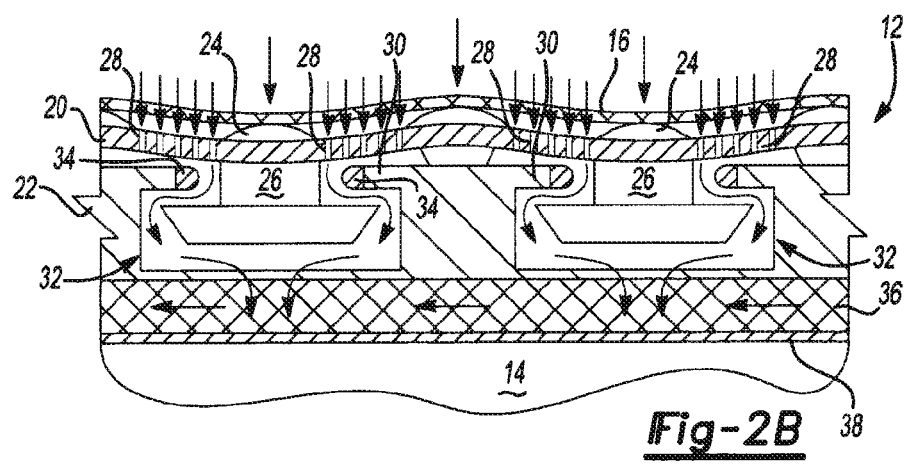

Referring to FIGS. 1, 2a and 2b, a first embodiment of the ventilated seat 10 is shown. The seat includes a valve sheet 12 located between a cushion 14 and an air permeable seat cover 16. In this configuration, the ventilated seat includes first layer 20, comprising a flexible member, which is separated from a second layer 22, via a plurality of spacer elements 24. It should be appreciated that the flexible member and/or the plurality of spacers may comprise foam, rubber or other material and may be the same or different. The first layer further includes a plurality of valve members 26, located between the spacer elements and a plurality of openings 28, also located between the spacers. As a result of the resilient flexible characteristics of the first layer, the valve members are adapted to move towards the second layer and subsequently return to an original position.

The second layer includes a plurality valves seats 30, which preferably has a corresponding shape to that of the valve member such that the valve member and the valve seat are adapted to join and form a seal. Together they form a plurality of valve assemblies 32. The material of the second layer may comprise of any suitable material and preferably is air permeable between the valve seats and is optionally flexible. Advantageously, in order to facilitate in sealing between the valve member and valve seat, the second layer includes a sealing material 34 (e.g., sealing ring or otherwise) adapted to improve the seal between the valve member and valve seat. It should be appreciated that the sealing material facilitates the sealing of the first layer to the second layer.

The first embodiment may further include a third layer 36 comprising a spacer. Preferably the air permeability of the third layer is greater than that of the second layer so that air flow will remain substantially within the third layer. Furthermore, preferably the air permeability of the third layer is substantial such that little resistance is created. However, it should be appreciated that the third layer may actually comprise a chamber to permit air flow. Advantageously, the third layer includes an air impermeable layer 38.

Referring to FIG. 2a, the valve assemblies 32 are in the close position. In the close position, valve members 26 are in a position where the outer edge of the valve members abut the sealing material 34 of the valve seat 30. This abutting configuration creates a seal preventing substantial air flow between the seat cover 16 and the passageways of the cushion 14.

When an individual occupies the seat, as shown in FIGS. 1 and 2b (with downward arrows), the valve member is moved away from the sealing material of the valve seat. This movement allows the air flow through openings 28 of the first layer and through the second layer and into the third layer. Upon the exit of the occupant from the seat, the valve members return to the position shown in FIG. 2a, as a result of the resiliency of the first layer, and the air flow substantially ceases.

It should be appreciated that for all the embodiments shown, the function opening and closing of the valves are predicated on the application of force against the valve. As such, ventilation typically only occurs at portions of the seat where force is applied (e.g., where bodily contact is made). This advantage creates a more efficient comfort system. While shown as drawing air, blown air may also be utilized. Still further, it should be appreciated that more or less valve assemblies may be used than as what is shown.

Figure 3:
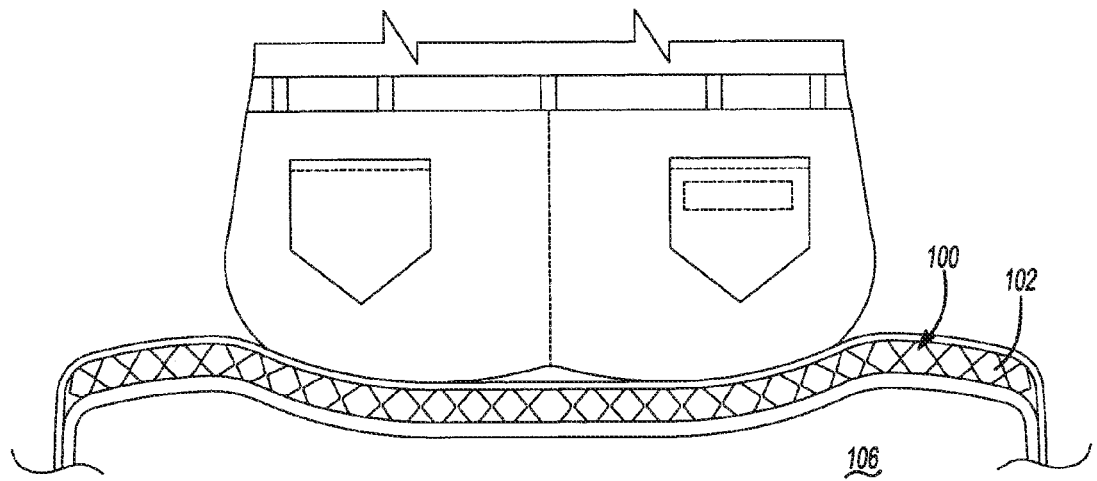
FIG. 3 illustrates a second ventilated seat according to the present invention.
Figure 4A:
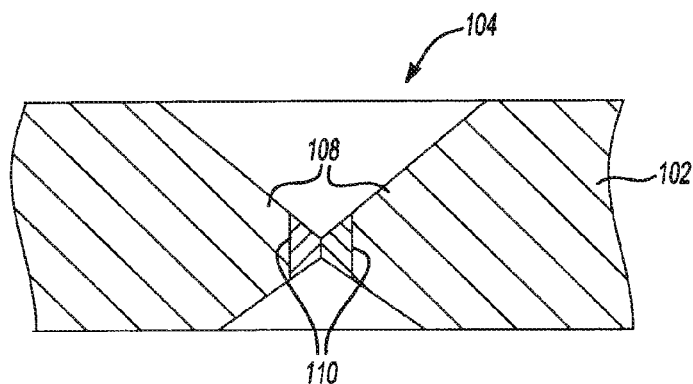
FIGS. 4a and 4b are enlarged views of the valve sheet of FIG. 3 shown with valve assemblies in open and closed positions, respectively.
Figure 4B:
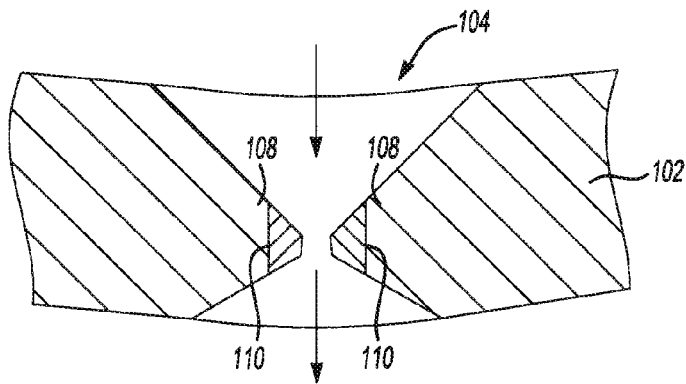
Figure 5A:
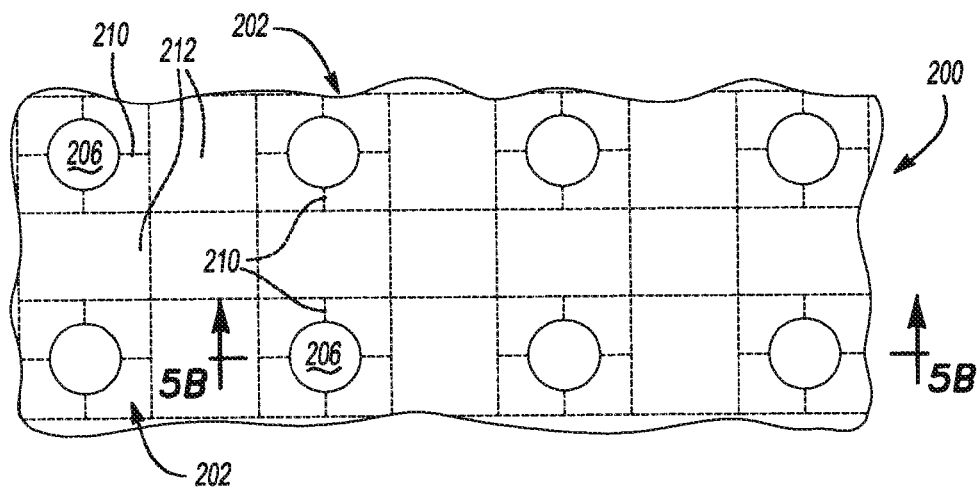
FIGS. 5a-c illustrates a third valve sheet according to the present invention, where the valve assemblies are shown in a closed position.
Figure 5B:
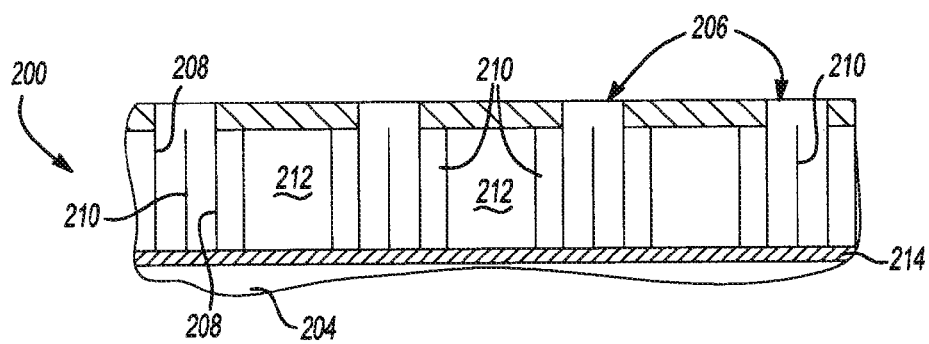
Figure 5C:
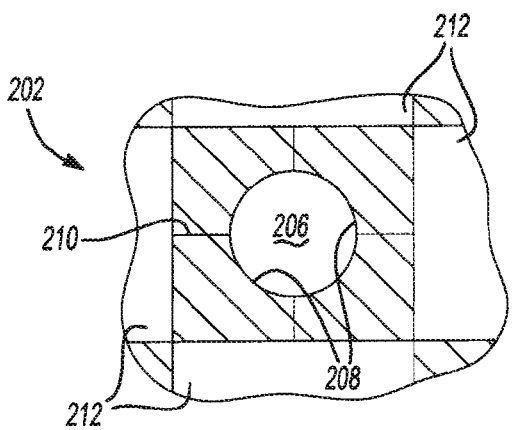
Figure 6A:
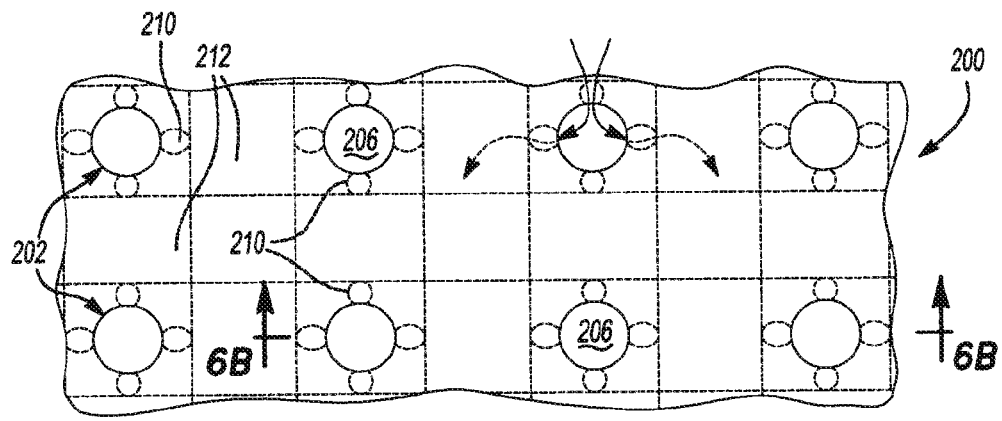
FIGS. 6a-c illustrates the third valve sheet of FIGS. 5a-c where the valve assemblies are shown in an open position.
Figure 6B:
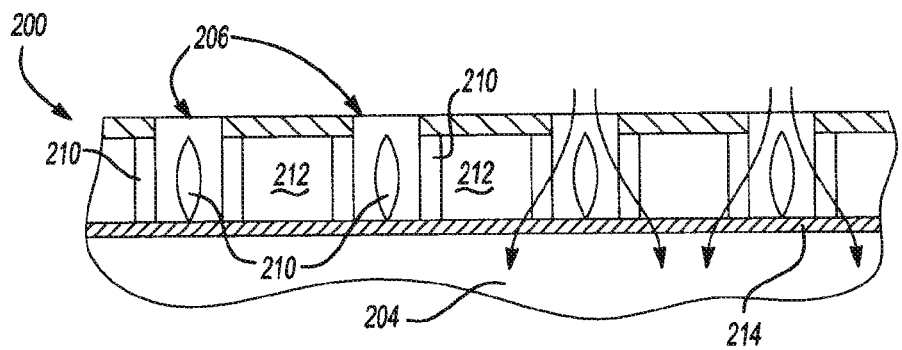
Figure 6C:
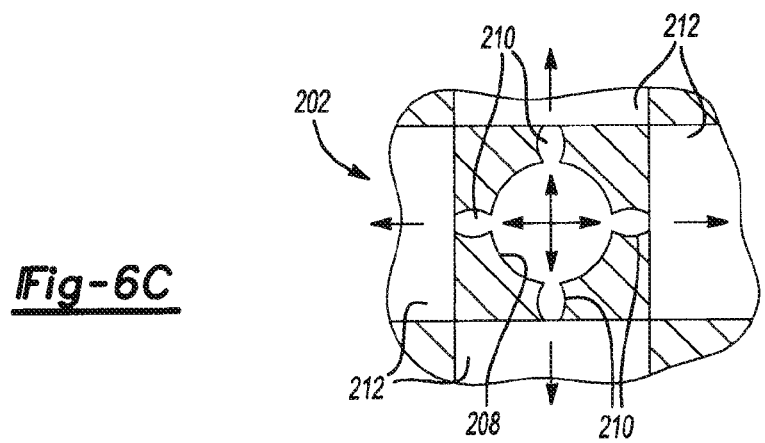
Figure 7A:
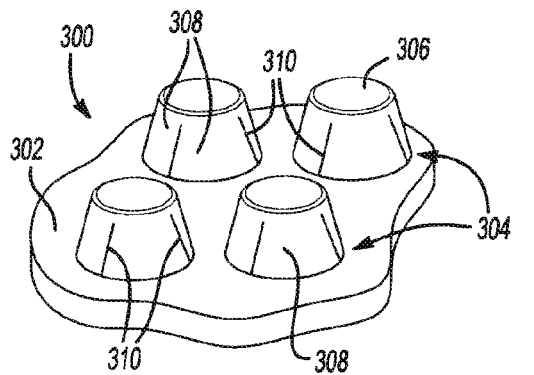
FIGS. 7a and b illustrates a fourth valve sheet according to the present invention, where the valve assemblies are shown in a closed position.
Figure 7B:
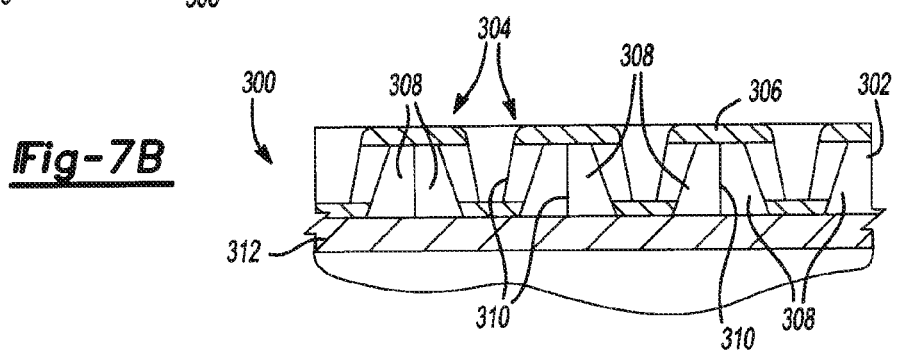
Figure 8A:
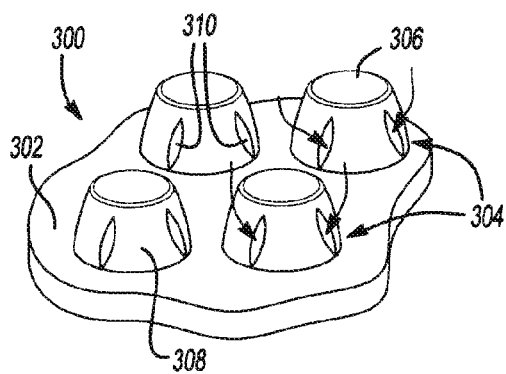
FIGS. 8a and 8b illustrate the fourth valve sheet of FIGS. 7a-b where the valve assemblies are shown in an open position.
Figure 8B:
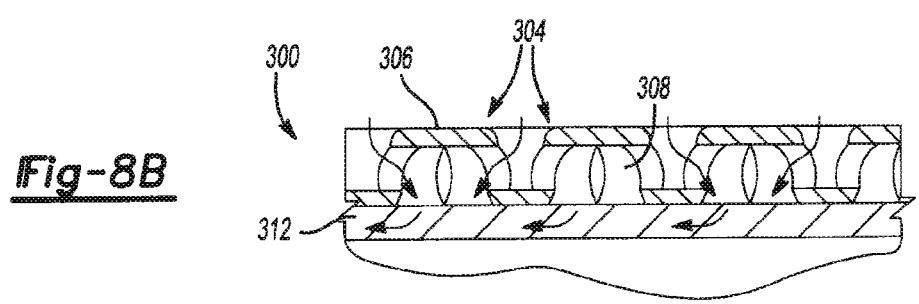
Figure 9A:
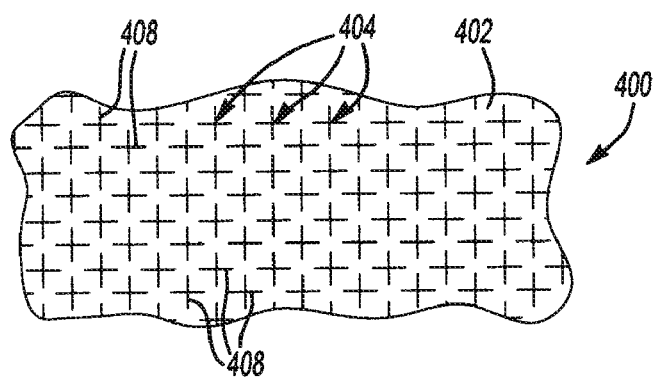
FIGS. 9a and 9b illustrate a fifth valve sheet according to the present invention, where the valve assemblies are shown in a closed position.
Figure 9B:
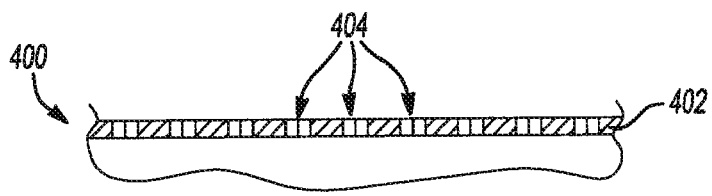
Figure 10A:
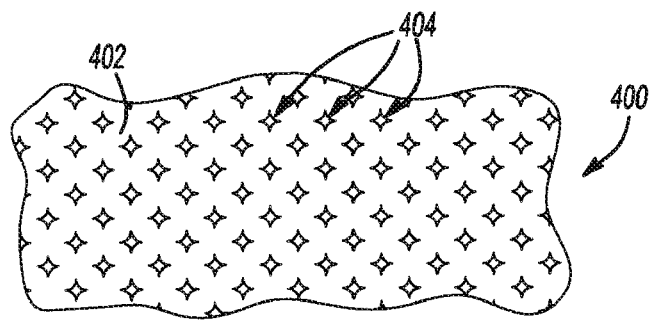
FIGS. 10a and 10b illustrate the fifth valve sheet of FIGS. 9a and 9b where the valve assemblies are shown in an open position.
Figure 10B:
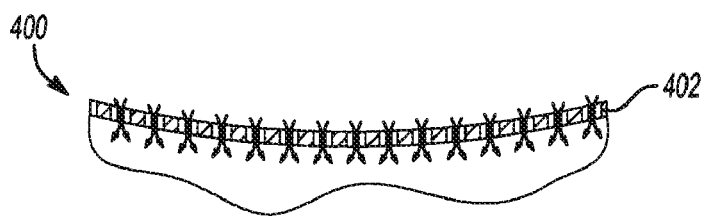
Figure 11A:
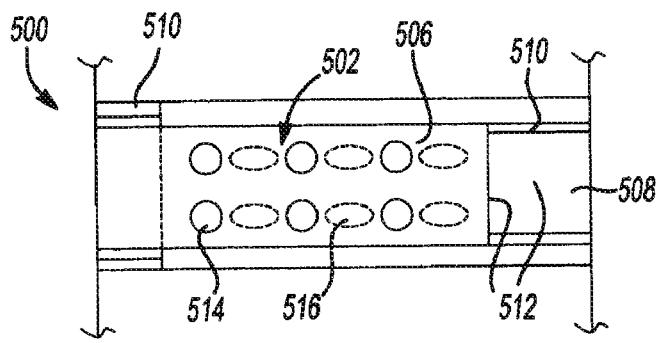
FIGS. 11a and 11b illustrate the sixth valve sheet according to the present invention, where the valve assemblies are shown in a closed position.
Figure 11B:
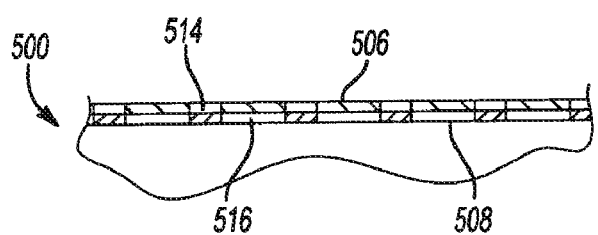
Figure 12A:
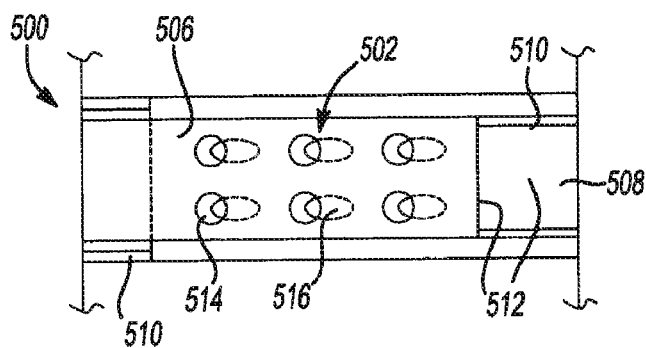
FIGS. 12a and 12b illustrate the sixth valve sheet of FIGS. 11a and 11b where the valve assemblies are shown in an open position.
Figure 12B:
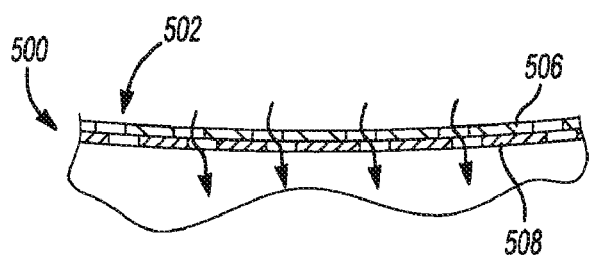

Referring to FIGS. 3, 4a-b, a second embodiment of the ventilated seat is shown. In this embodiment, the valve sheet includes only a single layer. In this embodiment, the valve sheet 100 includes a layer 102 comprising a plurality of valve assemblies 104 that are located throughout a substantial portion of the ventilate seat 106. The valve assemblies are configured with two or more lips 108 adapted to separate to form an opening for air flow. It should be appreciated that the lips of the valve assembly merely need to abut each other and no particular shape is required. Non-planar lips may also be utilized.

Advantageously, the lips of the valve assembly may include a distal end portion 110 comprising a material other than the material of the layer so as to improve sealing of the valve assembly. Preferably, the layer comprises a material that is flexible and resilient so that the layer can elastically deform but then return to an original position. Suitable materials include rubber though other materials are suitable. In operation, upon application of force, the lips separate to create an opening for air flow. Subsequently, when the force is removed the first layer returns to its original position (e.g., a sealing position) due to the resiliency of the first layer.

Referring to FIGS. 5a-6b, a third embodiment of ventilated seat is shown. The valve sheet 200 includes a layer with a plurality of valve assemblies 202 that are located throughout a substantial portion of the ventilated seat 204.

The valve assemblies comprise a plurality of first chambers 206 formed in the layer, having one or more side walls 208 and on one surface of the layer. The side walls include one or more discontinuities (e.g., cuts, slits, pair of lips or the like) 210 extending along the side walls of the first chamber. Preferably, the valve assemblies include four discontinuities, although other configurations are available. The layer includes a plurality of second chambers 212 having an opening on the surface opposite the surface with the openings of the first chamber. Preferably, the first and second chambers the sidewalls, sot that the discontinuities lead from one chamber to the other. It should be appreciated that, while cylindrical and cubical chambers are preferred for the first and second chambers respectively, other shapes and configurations of chambers are available. Optionally, the valve sheet includes an air permeable layer 214 (e.g., spacer) located near the surface with the second chambers.

In operation, upon compression the sidewalls of the chambers partially collapse, thereby creating one or more openings through the sidewalls at the discontinuities. The now open discontinuities permit air flow from one surface of the layer to the other.

Referring to FIGS. 7a-8b, a fourth embodiment of ventilated seat is shown. The valve sheet 300 includes a layer 302 with a plurality of valve assemblies 302. The valve assemblies comprise a protrusion 306 on the layer, such as a frustoconical protrusion with one or more side walls 308. The side walls include one or more discontinuities (e.g., cuts, slits, lips or the like) 310 extending along the side walls. The protrusions are substantially hollow. Preferably, the valve assemblies include four discontinuities, although other configurations are available. It should be appreciated that other shapes and configurations of protrusions are also available. Optionally, the valve sheet includes an air permeable layer 312 (e.g., spacer) located near the surface opposite the protrusions.

In operation, upon compression of the layer, the sidewalls of the protrusions at least partially collapse thereby creating one or more openings through the sidewalls in the area of the discontinuities. The now open discontinuities permit air flow from one surface of the layer to the other.

Referring to FIGS. 9a-10b, a fifth embodiment of the ventilated seat is shown. The valve sheet 400 includes a layer 402 comprising a plurality of valve assemblies 404. The valve assemblies comprise one or more discontinuities (e.g., cuts, slits, lips or the like) 408. Preferably, the discontinuities form a cross-like configuration, though other configurations are available.

In operation, upon application of force, the discontinuities separate to form openings through the valve sheet. This allows air to flow through the valve sheet and away from the occupant residing in the seat. Upon removal of the occupant, the insert returns to its original position and the discontinuity closes to create a seal in the valve sheet.

Referring to FIGS. 11a-12b, a sixth embodiment of the ventilated seat is shown. The valve sheet 500 includes a plurality of valve assemblies 502. The valve sheet comprises a first layer 506 and a second layer 508, each comprising a stretchable portion 510 and a substantially non-stretchable portion 512, located on opposite ends. Located on the non-stretchable portion of the first and second layer, there is defined a plurality of openings 514, 516 formed therethrough. The first layer and second layer are slidably located adjacent to one another and attached to each other, or otherwise affixed at two opposing ends. Advantageously, the first layer, second layer or both comprise or otherwise includes a material adapted to reduce fiction between the members, such that the layers can slide relative to one another with little friction.

In operation, in a relaxed position, the openings of the first and second layers do not align, thereby created a substantial seal. Upon the occupant sitting in the seat, the stretchable portion of the first and second layer stretches thereby allowing the non-stretchable portions of the first and second layers to move relative to one another. This movement causes the openings of the first and second layers to align thereby creating opening through the valve sheet, whereby air may be moved through the ventilated seat and valve layer to improve comfort of an occupant residing in the ventilated seat.

In another embodiment, both layers are made of a flexible but stretchable material. The operation is substantially the same as the previous embodiment in that when the occupant sits in the seat, the holes in the two layers align.

For ease of production, the valve assemblies of the valve layer are preferably evenly distributed across the entire surface of the ventilated seat. Other distribution patters are also contemplated, such as, selectively placed where the occupant is likely to contact the ventilated seat.

In another aspect, selective application of thermal regulation may be provided to a plurality of automotive seats, which includes the use of a valve sheet. For example, a single thermal regulation system may be provided in a vehicle, wherein the system includes a blower connected to the valve sheets of the seats. As such, air movement will be limited to seats having occupants therein (e.g., an applied force to the valves to cause the valves to open). In this configuration, a minimum amount of components may be used (e.g., blower, heaters, coolers, dehumidifiers or otherwise), which further reduces the power requirements of the automobile.

The valve sheet is preferably utilized in an automotive seat. However, it should be appreciated that the present invention may be used in other application other than an automotive seat member. For example, the regulation system may be used in transportation industries where comfort of the occupant is desired. Such industries include airline, locomotive, bus, trucking, subways, or other mass transportation systems. In such industries the present invention may be used by both the employees of the transportation system or the passengers thereof. In other application, the regulation system may be use in mass occupant facilities including, auditoriums, stadiums, theaters, hospitals, theme parks, or other facility in which seating is provided to patrons. Still further, the regulation system may be used in individual seats such as office chairs, lounge chairs, dining chairs or otherwise.

When a cushion is included, the valve sheet is typically located beneath a seat cover and above any cushion. The cushion may include one or more ducts that extend partially or completely through the cushion, or the cushions may be free of ducts that extend through the cushion. A preferred cushion is a molded plastic foam, which is preferably free of a molded or cut-out fluid distribution ducting network, but may be adapted with a trench or opening for passing apportion of an insert from one side of the cushion to the another side. The seat cushion and/or backrest cushion may in turn be supported by a seat frame.

Preferably, the cushion comprises one or more passageways formed therethrough for the flow of air, wherein each passageway extends between a first end and a second end and may include one or more openings formed through the surface of the cushion at the first and/or second end. In a preferred embodiment, the cushion include means for maintaining the shape of the passage way and supporting the insert. Suitable means includes air permeable material such as open cell foam. However, a most preferred material is also a resilient member adapted to provide suitable support for the insert. Alternatively, the passage may be formed so as to improve strength of the passageway. For example, the passage way may be formed with a skin member or other increased density configuration. Still further, the passage way may be coated with a reinforcing agent or air impermeable lining.

However, the cushion may include means for defining the passageways formed therethrough. Such means may include duct systems, tubing systems or the like that may be inserted into a portion of the cushion and is preferably substantially air impermeable or otherwise includes an air impermeable lining. It should be appreciated that such means may be conveniently used to fluidly connect a fan to the valve sheet, as discussed herein, such that air can be drawn or blown through the cushion with little to no leakage.

In a preferred embodiment, the cushion includes an open space at one of the first or second ends of the passageways and preferably at the end proximate to an individual. Advantageously, the open space is adapted to draw or distribute the air passing through the passageway along the spatial area defining the opening. As such, preferably, the valve sheet is located proximate to the open space for even distribution of the air across the insert.

In a most preferred embodiment, the cushion further includes an air impermeable layer or lining that acts to substantially restrict airflow to the passageway. Accordingly, the air impermeable layer may be located externally to the cushion or may line the interior portion defining the one or more passageways. Suitable air impermeable layers include rubber or plastic layers, though others are available. Furthermore, the air impermeable layer may comprise the material of the cushion itself, which may include skin formed over the surface of the component or otherwise.

When an insert is utilized, the valve sheet may be separate from the insert, attached to the insert or a component or layer of the insert. Suitable inserts include edge sealed (e.g. U.S. application Ser. Nos. 10/434,890; filed May 9, 2003 or 10/822,518, filed Apr. 4, 2004) or otherwise (e.g. U.S. application Ser. No. 10/463,052; filed Jun. 17, 2003). One or more different kinds of layers may be used to make up the insert. For example, the insert may include one or more spacers to provide an open space within the insert. One or more flow control layers may be included to provide selective flow of fluid between one or more layers of the insert, between the insert and the rest of the seat, or between the insert and the ambient. One or more fluid barriers may be included. Other optional layers include layers that include heaters, coolers, one or more additional spacers, one or more covering layers, and/or one or more layers that assist in the manufacture of the insert.

The spacer may be any structure, material or combination of materials and/or structures that permits fluid flow through the material while also providing a measure of support for a seat occupant. The spacers should not collapse under the weight of a seat occupant and maintain the fluid communication through the spacer. As one example, the spacer may include rubber, foam plastic or the like. In one aspect, the spacer may include a reticulated foam or springs.

One preferred spacer is formed of polymeric (e.g., polyester) strand material that is interwoven to provide opposing honeycomb structures (e.g., fabric panels), which are interconnected by several additional polymeric strand materials to provide open space between the structures while still providing cushion and support. Another preferred spacer is formed of a polymeric material in a helix held between two sheets of material.

The insert may further comprise one or more air impermeable lining for assisting in the directing the flow of air through the insert. For example, it is contemplated that the outer most layer located between the valves and the ventilation seat may include an air impermeable lining for directing air to the outer circumference of the insert. As such, it is contemplated that the insert may be configured with open side to allow air to flow through the circumference of the insert and through to the valves or passageway of the ventilation seat, or both.

The insert, ventilation device, trim cover or otherwise, of the present invention further contemplates the use of additional comfort control devices for optimizing the temperature of the ventilation seat. Accordingly, it is contemplated that the insert further include a heating device, cooling device or both.

For example, in one aspect, the insert of the present invention may further include a suitable heating device for increasing the temperature of the insert, ventilation device, trim member or any individual in contact thereof. One suitable heater comprises a plurality of wires adapted for heating upon application of a current. Another suitable heater comprises a thermoelectric device such as a positive temperature coefficient (PCT) device, which is also adapted to heat upon application of a current. Optionally, the heating device includes a thermostat for monitoring and/or regulating the temperature of the heater.

Multiple inserts may be used on a single seat or backrest cushion, where inserts may accomplish the same or different functions (e.g. one insert may only cool, while another insert may both heat and cool).

When a fan is utilized, the fan provides motive force to move air (whether conditioned, ambient, pushed, pulled and combinations thereof) through the valve sheet. The fan may be used to push air to the insert or pull air from the valve sheet and thus through the ventilation seat, insert, seat cover, combinations thereof or otherwise. The fan may be adapted to force air, draw air, or both, through the components of the ventilated seat. However, in a preferred embodiment, the fan is adapted to draw air through the component of the ventilated sea. Accordingly, the ventilated sea is adapted to draw the heat generated by an individual, more so an occupant, away from the individual so to improve comfort of the individual.

The fan may also be used to both push and pull air. For example, at least two sets of fan blades (e.g. with vanes that are opposite in direction) that share a common axis and form a binary fan that is able to both push and pull air. Multiple fans may also be used. The fan may also include an annular inlet, although fan that are free of annular inlets are also contemplated. Included in the definition of fan are impellers (including bidirectional impellers), blowers, or the like. The fan also refers to devices that provide motive force to move other fluids (e.g. liquids) through the insert. The fan may provide a steady fluid flow, a pulsating fluid flow, an oscillating fluid flow, or the like.

However, alternatively, or in conjunction therewith, the fan may pump or otherwise force air through the system so as to come in contact with an individual to achieve a similar comforting sensation. This is particularly advantageous in the pumping of heated, cooled or otherwise conditioned air. This may be used alone or in combination with any other heating or cooling device of the insert or other component of the comfort system. It should be appreciated, that in one aspect, that the conditioned air may be generated from a heating or cooling system of a vehicle (e.g. the HVAC system). Likewise, the fan may comprise the blower used to move heated or conditioned air generated by a vehicle.

The fluid conditioning device may be any device that heats or cools fluid. The device may be a combination of devices where one component provides heating and another component provides cooling. Preferably, one device or system provides both heating and cooling. The device may be an external device such as the HVAC&R system in the building or vehicle where the seat is located or an internal device meaning that the device is not connected (other than to a power supply) to the building or vehicle where the seat is located. In addition to providing temperature conditioning the fluid conditioning device may also dehumidify the fluid (e.g. air).

Preferably, the fluid conditioning device is a self contained or solid state device that both cools and heats air. The most preferred device is a peltier or thermoelectric device (TED). TEDs are commercially available devices that provide solid state heating and cooling by passing electricity through the device. TEDs include a waste side and an active side, which are relative designations depending whether warm or cool temperature conditioned air is desired. Any supplier of TEDs would be able to provide suitable devices for use in the present invention, with TEDs from Tellurex (Telluride, Colo.) being preferred. The TED may be combined with any useful heat dissipation device; e.g. heat sinks, heat exchangers, fans, heat pipes or the like.

In addition, one or more conduits may be used to provide fluid communication between components of the ventilated seat such as between a fan and an insert between an insert and a fluid condition device.

One or more valves may be used to redirect fluid flow through the system to make use of unused energy (i.e. the fluid is hotter than ambient) or energy capacity (i.e. the fluid is colder than ambient) in the fluid. For example, the valves may be used to vent fluid to ambient to dispose of un-needed energy stored in the fluid. The valves may also be used to redirect fluid to components of the system (e.g. the fluid conditioning device) to either warm or cool such components. In addition, a valve may be used to optionally recirculate fluid within system to create a closed or partially closed system.

A variety of sensors may be included in the system such as temperature sensors, humidity sensors, current sensors, occupant detection sensor, weight sensors or the like. Sensors may be placed throughout the system. For example, temperature sensors may be place within the spacer, between spacers, between the spacer and any additionally optional layer (e.g. reticulated foam or seat cover), near the fluid conditioning device, near the fan, and combinations thereof.

Advantageously, one or more controllers may be used to receive inputs from the sensors or a used control device, to issue instructions to the fan and fluid conditioning device, and/or to otherwise coordinate the operation of the system.

Accordingly, the ventilated sea may further include a control device for controlling the functions of the system. For example, the control device may be adapted to control the operation of the fan, any heating device, cooling device or a combination thereof. Accordingly, the control device may be in further communications with a temperature sensor. Furthermore, it is contemplated that the controller may be in communications with an occupant sensor to determine if one or more individuals is proximate or otherwise is occupying the ventilated seat.

For example, in one aspect of an automotive application, the fan may only be activated upon occupancy of a ventilated seat (e.g., seat, seatback or otherwise). In this configuration, an occupancy sensor may be used to determine whether an individual is located in the seat. If an individual does, the fan is activated to move air through the ventilated seat, which is, in part, the result of the pressure being applied to the valve assemblies of the valve sheet so as to create a flow path for the air.

Alternatively, the fan may be activated with the occupancy of any ventilated seat, wherein fluid is only moved through the ventilated seats which are occupied because of the necessity of occupant for opening of the valves. It should be appreciated in either one of the two examples that the fan device may run continuously so as to remove the necessity of an occupancy sensor.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only three of the illustrated embodiments, such feature may be combined with one or more other features of other embodiments, for any given application. It will also be appreciated from the above that the fabrication of the unique structures herein and the operation thereof also constitute methods in accordance with the present invention.

It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A ventilated seat, comprising:
   a valve sheet including a thickness and being located between a cushion and an air permeable seat cover, the valve sheet defining one or more discontinuities extending through the thickness of the valve sheet to form one or more valves, wherein upon application of suitable force the one or more discontinuities are configured to change shape to form an opening extending through the valve sheet for allowing fluid flow therethrough and upon removal of said force the one or more discontinuities return to an original shape to close the opening, wherein the valve sheet is in fluid communications with a fluid conditioning unit, and wherein the discontinuities formed by the valve sheet comprises crosses formed on a surface of the valve sheet which extend through the thickness of the cross section of the valve sheet, further wherein the valve sheet further includes a heating device.

2. The ventilated seat of claim 1, wherein the heating device comprises a plurality of wires adapted for heating upon application of a current.

3. The ventilated seat of claim 1, wherein the heating device comprises a positive temperature coefficient device adapted for heating upon application of a current.

* * * * *